United States Patent
Koyama et al.

(10) Patent No.: US 6,921,583 B2
(45) Date of Patent: Jul. 26, 2005

(54) AL-CU BONDED STRUCTURE AND METHOD FOR MAKING THE SAME

(75) Inventors: Ken Koyama, Amagasaki (JP); Keiji Miki, Amagasaki (JP); Makoto Yoshida, Higashihiroshima (JP); Kenji Shinozaki, Higashihiroshima (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 19 days.

(21) Appl. No.: 10/781,358

(22) Filed: Feb. 17, 2004

(65) Prior Publication Data

US 2005/0029333 A1 Feb. 10, 2005

Related U.S. Application Data

(63) Continuation of application No. PCT/JP03/10324, filed on Aug. 13, 2003.

(30) Foreign Application Priority Data

Aug. 7, 2003 (JP) ...................................... 2003-289237
Aug. 7, 2003 (JP) ...................................... 2003-289357

(51) Int. Cl.$^7$ .......................... B32B 15/20; B23K 20/04; B23K 35/28
(52) U.S. Cl. ....................... 428/652; 428/650; 428/673; 228/235.3; 228/262.51; 228/262.61; 228/158
(58) Field of Search ................................ 428/650, 652, 428/673, 926; 228/262.6, 262.61, 262.5, 262.51, 235.2, 235.3, 158, 245

(56) References Cited

U.S. PATENT DOCUMENTS 2,790,656 A * 4/1957 Cook .......................... 403/270
2,916,815 A * 12/1959 Donkervoort et al. . 228/262.51
3,105,293 A * 10/1963 Skinner et al. ............. 228/132
3,119,632 A * 1/1964 Skinner .................. 285/148.12
3,310,388 A * 3/1967 Bennett et al. ............. 428/594
3,551,998 A * 1/1971 Bennett ...................... 228/194
4,331,286 A * 5/1982 Miyazaki et al. ........... 228/198
6,521,108 B1 * 2/2003 Zhang ................... 204/298.13

FOREIGN PATENT DOCUMENTS

DE         2406828      *  8/1975
JP         49-099941    *  9/1974
JP         07-223090 A1    8/1995

OTHER PUBLICATIONS

Patent Abstracts of Japan for JP07–223090 published on Aug. 22, 1995.

(Continued)

*Primary Examiner*—John J. Zimmerman
(74) *Attorney, Agent, or Firm*—Darby & Darby

(57) ABSTRACT

With an Al—Cu bonded structure, an Ag layer can be remained at the Al—Cu bonding interlayer providing ductile deformation behavior and a tensile strength at the bonded interlayer similar to that of the Al base material. This results in superior bonding characteristics. Furthermore, a thin Al—Cu bonded structure can be obtained as a result of using the Al—Cu dissimilar material bonded section, which has superior workability, as the base material to perform rolling for wall-thickness reduction. The thin Al—Cu structure has superior dimensional accuracy and can meet diverse dimensional demands. The structure combines the light weight of Al with its particular heat transfer and heat dissipative characteristics and anti-corrosive properties of Cu, allowing it to meet the compact, thin, light-weight, and high-performance needs of electronic devices. The structure can be widely used in heat exchanges and heat transfer devices.

14 Claims, 6 Drawing Sheets

OTHER PUBLICATIONS

"Evaluation of Brazing Properties using Al–Si–Mg–Bi Brazing Alloy—Development of Brazing Technique for Al–Cu Dissimilar Joint (Part 1)" by Ken Koyama, Kenji Shinozaki, Kenji Ikeda, Keiji Miki and Hidenori Kuroki in Keikinzokuyousetsu, vol. 40 (2002) No. 9.

"Improvement of Strength of Brazing Joint using Ag as Insert Metal—Development of Brazing Technique for Al–Cu Dissimilar Joint (Part 2)" by Ken Koyama, Keiji Miki, Shizuo Masumoto, Atsushi Mochida, Kenji Ikeda, Makoto Yoshida and Kenji Shinozaki in Keikinzokuyousetsu, vol. 41. (2003) No. 2.

"Controlling Factor of Al–Cu Dissimilar Brazing Joint Strength Using Ag Insert Metal—Development of Brazing Technique for Al–Cu Dissimilar Joint (Part 3)" by Ken Koyama, Keiji Shinozaki in Keikinzokuyousetsu, vol. 41 (2003) No. 9.

* cited by examiner

AL-CU BONDED STRUCTURE AND METHOD FOR MAKING THE SAME

CROSS-REFERENCE TO RELATED APPLICATION

This application is a Continuation of International Patent Application Ser. No. PCT/JP03/10324 filed Aug. 13, 2003.

FIELD OF THE INVENTION

The present invention relates to a thin bonded structure of an aluminum or aluminum alloy ("Al (aluminum)") component and a copper or copper alloy ("Cu (copper)") component and a method for making the same.

BACKGROUND OF THE INVENTION

Superior heat transfer properties and light weight are desirable in heat exchangers, heat dissipaters, heat pipes, heat sinks, and the like, which are used in electronic devices, communication devices, and transportation devices such as automobiles and aircraft. While Cu (copper) has good heat transfer and heat diffusion properties, Al (aluminum) is widely used for heat exchangers and heat transfer materials because of its light weight and heat transfer properties that are almost as good as those of Cu. More specifically, improvements for enhancing heat transfer properties have been developed for Al heat exchangers used in electronic devices by enlarging the cooling area, increasing the material thickness, and the like. However, with the significant demands made in the electronic device field regarding compactness, thin design, light weight, and high performance, there is a limit to enhance the heat transfer properties obtainable from these improvements.

Such being the case, there is a demand for an Al—Cu bonded structure that combines the superior heat transfer properties of Cu with the light weight of Al to provide heat transfer properties that exceed those of Al while keeping weight increases at or below that of Cu.

Conventionally, many different methods for dissimilar metal bonding of Al and Cu have been investigated, e.g., solid-phase bonding methods such as friction welding and explosive bonding, and diffusion bonding. Some of these bonding methods have been implemented practically. With these bonding methods, however, the bonding of large areas or complex shapes is difficult, and there are restrictions on the shape and dimensions of component to be bonded whilst implementation for precision parts, e.g., electronic devices, is difficult.

Brazing is a technology that has been in wide use for a long time as a method for bonding metals. Because of its simplicity and the degree of freedom that is offers for the materials that can be used, the method can be easily applied to precision parts. Since it is expected that there will be a demand for lower-cost processing of precision parts, the application of brazing in bonding Al and Cu is being studied.

FIG. 1 shows a schematic illustration of a representative bonded interlayer where Al and Cu are directly brazed using an Al—Si—Mg—Bi-based brazing sheet. The brazing conditions in this case are as follows: an Al—Si—Mg—Bi-based brazing sheet is used; the brazing temperature is 803 K (530 deg C.), and the brazing time is 60 sec.

As the figure shows, the Al—Cu bond shows the formation of two intermetallic compounds: a layered δ phase and a θ phase of irregular form. Both of these are Al—Cu intermetallic compounds.

In order to clarify the properties of the Al—Cu bonded interlayer, the hardnesses of the Al base material, the Cu base material, and the intermetallic compound were measured. It was found that, while both based material Al and the Cu base material had a hardness of no more than Hv 100, intermetallic compounds (the layered δ phase and the θ phase of irregular form) had of Hv 480–620, which is considerably harder than base materials, implying brittle structure.

The results of a shear fracture test of the brazed joints indicated that the bond was brittle with regard to fractures mechanism while this was accompanied by almost no deformation in the base material. More specifically, deformation took place at the bonded interlayer, with the shear strength of the brazing joints being up to approximately 12.5 Mpa, while is considerably lower than the shear strength of 65 Mpa of the Al base material (industrial pure Al).

Thus, in the brazing joints where Al and Cu are directly bonded, the strength of the joints is determined by the strength of the intermetallic compound layer formned at the bonded interlayer. This results in a brittle fracture mechanism that limits the strength of brazing joints. For this reason, a structure in which Al and Cu are directly brazed cannot be used in the heat exchangers, heat dissipators, heat pipes, heat sinks, and the like described above.

Thus, at the bonded interlayer where Al and Cu are directly brazed, a δ phase and a θ phase are formed being made of Al and Cu, as two types of intermetallic compounds with extreme hardness, and their strengths and structural morphology affect the strength of the brazing joints.

In order to improve the strength of the Al—Cu brazing joints, brazing tests were performed using various metals as an insert material, and it was found that the strength of brazing joints could be best achieved when Ag is used as insert material. More specifically, by inserting Ag into the Al—Cu bonding interface, the creation of intermetallic compounds due to the direct reaction of Al and Cu could be restricted, thus improving bonding strength.

Based on observations such as this, the present inventors first proposed an invention relating to "a method and structure for bonding an Al component and a Cu component in which, when an Al component and a Cu component are bonded, a metal layer, more specifically an Ag layer, is formed on the bonding interface of the Cu component, and this Ag layer and the bonding interface of the Al component are brazed" (see Japanese patent application number 2002-321182).

FIG. 2 is a schematic illustration showing a representative structure of a dissimilar material bonded interlayer that uses an Al—Si brazing sheet, and that Ag is inserted into the Al—Cu bond interface as an insert material. The brazing conditions are as follows: an Al—Si—Mg—Bi-based brazing sheet is used; the brazing temperature is 823 K (550 deg C.), the brazing time is 600 sec.

According to an equilibrium diagram of the Ag—Cu binary system, this combination is a standard eutectic reaction system. Intermetallic compounds are not created over the entire composition range, and the eutectic temperature is as high as 1052 K (779 deg C.). As a result, the Cu—Ag interlayer does not exhibit structural changes, and there are no Al or Cu reactions or its derivative intermetallic compounds.

The zone where Ag-brazing sheet bonded interlayer shows complex morphology, and is divided into four regions, as shown in the schematic illustration in FIG. 2. Region I having an irregular form is generated on the reaction boundary between the brazing sheet and Ag, and Region II, formed as agglomerations, is found within this Region I. Region III is formed in Region IV as a lacy plate grown toward the brazing sheet side from Region I.

The results of X-ray analysis indicates that Region I and Region II are the Al—Ag intermetallic compounds $Ag_2Al$. Also, Region II is Si in the brazing sheet, and Region IV is Al.

Testing the hardness of the intermetallic compound shows that $Ag_2Al$ has a hardness of approximately Hv 300, which is softer than the δ and θ phases shown in FIG. 1. A tensile test of the brazing joints shows ductile fracture of the Al base material, with the tensile strength of the brazing joints being similar to that of the Al base material. Thus, compared to the direct brazing of Al—Cu, the strength is significantly improved.

Thus, by using Ag as an insert material in an Al—Cu bonding interface and forming a brazing joints, the remained Ag obstructs direct reaction between Al and Cu. As a result, the formation of the harmful intermetallic compound can be prevented. Also, since $A_2Al$, which is formed as an intermetallic compound, is relatively soft and is dispersed in a lacy manner in the Al matrix, the Ag—Al bonded interlayer shown in FIG. 2 is able to provide superior bonding characteristics.

When using Ag as an insert material in the Al—Cu bonding interface, however, the strength of brazing joints may not be stable depending on the brazing conditions. A brazing test was performed in which the brazing temperature was varied over the range of 793 K (520 deg C.)–843 K (570 deg C.) and the brazing time was varied over the range of 60–3600 sec. The brazing condition of test pieces under these conditions were visually inspected.

FIG. 3 shows the results from visual inspections of test pieces brazed using the above conditions with Ag used as an insert material. In this figure, "X" indicates poor brazing due to inadequate formation of a liquid phase; "Δ" indicates partial formation of a liquid phase; "○" indicates good brazing with adequate liquid phase formation; and "□" indicates prominent fusing of the Al base material due to excessive liquid phase.

Based on the results shown in FIG. 3, there is a limited range of brazing conditions that provide good brazing. To providing consistent, stable bonding characteristics, it is important that the brazing temperature is set up in an appropriate range and an appropriate brazing time is set up.

As described above, the trend in the electronics device industry toward designs that are compact, thin, and lightweight and provide high performance leads to a demand for flexibility in design for various types of heat exchangers and heat transferring devices, since these can be used for precision parts.

The flexibility of design demanded of heat exchangers and heat transfer devices is not limited to dimensional accuracy of devices but also includes the flexibility in setting dimensions to accommodate the diversity in dimensions used by devices. Thus, with the Al—Cu bonded structure described above, there is a demand for superior flexibility in design.

As described above, in order to provide adequate strength of Al—Cu brazing joints, an innovative invention has been developed to provide an Al—Cu bonded structure and method for making the same in which Ag is used as an insert material. However, producing this Al—Cu bonded structure in a stable manner for wide use in heat exchangers and heat transfer devices requires solving a number of problems.

The first problem is that when performing Al—Cu brazing, stable bonding characteristics (tensile strength of brazing joints, deformation behavior) must always be maintained. The second problem is the need to provide superior dimensional accuracy to accommodate the dimension characteristics required in heat exchangers and heat transfer devices, and to provide flexibility in dimensions to accommodate the increasing diversity in dimensions.

SUMMARY OF THE INVENTION

The object of the present invention is to overcome these problems in Al—Cu bonded structures and to provide an Al—Cu bonded structure and method for making the same wherein appropriate brazing conditions are selected when brazing so that stable bond characteristics are achieved, a component formed with an Al—Cu dissimilar material bonded interlayer having superior workability is obtained, superior dimension characteristics are obtained by performing rolling, and the light weight of Al and the heat transfer, heat dissipation, Cu can be combined.

The present invention relates to a thin bonded structure of an aluminum or aluminum alloy (referred collectively as "Al (aluminum)") component and a copper or copper alloy (referred collectively as "Cu (copper)") component and a method for making the same.

More specifically, the present invention relates to an Al—Cu bonded structure and a method for making the same wherein, when performing brazing using silver or silver alloy (Referred collectively as "Ag") as an insert material in the bonding interface between the Al component and the Cu component, the brazing conditions are selected appropriately so that a structure with strong bonding strength and ductile deformation behavior is provided.

Furthermore, the present invention also relates to an Al—Cu bonded structure and method for making the same wherein superior dimension characteristics can be provided by performing rolling or, more preferably, hot rolling, on the resulting Al—Cu bonded structure.

That is, various implementations of the present invention directed to the "first Al—Cu bonded structure" and the "second (thin) Al—Cu bonded structure" and the methods of making the same are described below.

1. "First Al—Cu Bonded Structure" and Method of Making the Same (1) In a brazed bonded structure, using Ag as an insert material on a bonding interface between an Al component and a Cu component, an Ag layer remains on the bonding interface between the Al component and the Cu component after brazing.

(2) In a method of making an Al—Cu bonded structure, when brazing an Al component and a Cu component, Ag is used as an insert material on a bonding interface thereof, with a layer of the Ag being made to remain between the components.

(3) In a method for making an Al—Cu bonded structure, when brazing an Al component and a Cu component, Ag is used as an insert material on a bonding interface thereof, brazing is performed at a temperature of more than 813 K (540 deg C.), and a layer of the Ag is made to remain between the components.

In the method of making an Al—Cu bonded structure as described in (3), it would be preferable, when the insert material has a thickness of 100 microns, for the brazing to be performed at a temperature of 823 K +/−5K (550 deg C. +/−5 deg C.) with a brazing time of no more than 1800 sec.

Furthermore, in (1)–(3) above, it would be preferable for the remaining Ag layer to have a thickness of 10 μm or more.

2. "Second Al—Cu Bonded Structure and Method for Making the Same

The "second Al—Cu bonded structure" is the "first Al—Cu bonded structure" of the present invention upon which a wall thinning work is performed. In order to distinguish it from the "first Al—Cu bonded structure", it will be referred to as the "thin Al—Cu bonded structure".

(1) A brazed joints component is rolled to produce a thin Al—Cu bonded structure. The brazed joints component has Ag as an insert material in a contact interface of an Al component and a Cu component.

In the thin Al—Cu bonded structure, it would be preferable for the thickness to be 0.1 mm or more and to perform wall-thickness reduction of the brazed joints component through hot rolling.

(2) With regard to a method of making a thin Al—Cu bonded structure, rolling is performed on a brazed joints component in which Ag is used as an insert material in a contact interface between an Al component and a Cu component.

In this method of making a thin Al—Cu bonded structure, it would be preferable to perform hot rolling at 623 K–773 K (350 deg C.–550 deg C.), to perform hot rolling repeatedly with a reduction of 20% +/−10% at each rolling, and to perform annealing after finishing hot rolling.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

A "first Al—Cu bonded structure" and method for making the same and a "thin Al—Cu bonded structure" and method for making the same will be described below.

In the descriptions below, Al refers to pure Al or Al alloys in general and Cu refers to pure Cu or Cu alloys in general. The Ag used as an insert material refers to pure Ag or Ag alloys in general.

The "brazing" used in the present invention does not involve special restricted conditions and can be any method generally used to form an Al—Ag bond. To form $Ag_2Al$, an Al—Ag intermetallic compound, at the brazed bond in a stable manner, it would be preferable to use an Al—Si-based brazing sheet, and it would especially be preferable to use an Al—Si—Mg—Bi-based alloy brazing sheet.

The "rolling" used in the present invention does not involve restrictions in the rolling equipment, the rolling conditions, or the like, and can be a conventional rolling method commonly used for Al rolling such as cold rolling or hot rolling.

1. "First Al—Cu Bonded Structure" and Method for Making the Same

Out of the objects described above, the object of the "first Al—Cu bonded structure" is to provide stable bond characteristics (tensile strength, deformation behavior of the bond) in an Al—Cu brazing joints.

In order to achieve this object, the present inventors performed Al—Cu brazing using Ag as an insert material under various conditions and performed a detailed survey of the relationship between brazing conditions and the strength of brazing joints.

Figure 4:
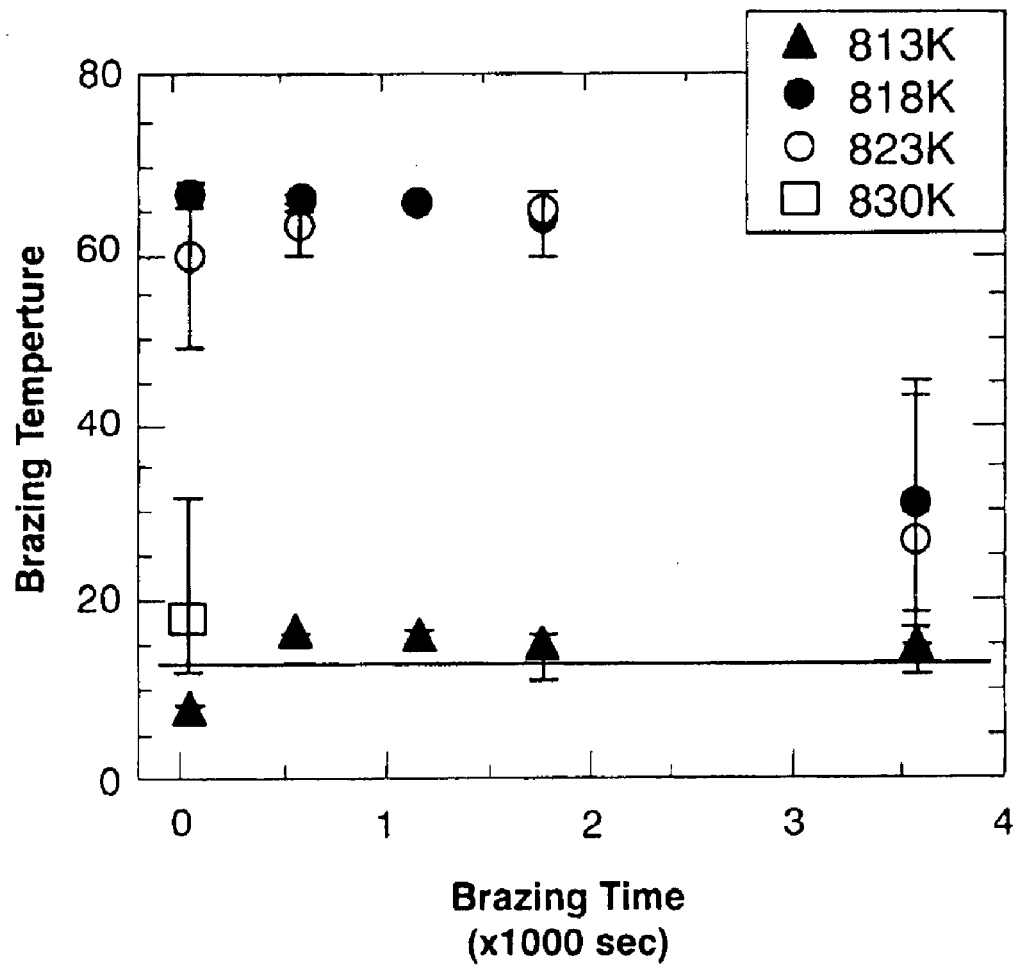
FIG. 4 is a drawing showing the relationship between tensile strength of the brazing joints and brazing time with different brazing temperatures (813–830 K (540–557 deg C.).

FIG. 4, which illustrates an embodiment described later, shows the relationship between the tensile strength of brazing joints and brazing time for different brazing temperatures. As the figure shows, a brazing temperature of 813 K (540 deg C.) provides insufficient liquid phase formation, resulting in inadequate brazing. This leads to brittle fractures accompanied by almost no deformation of the base materials and also leads to very low tensile strength values.

When the brazing temperature is 818 K (545 deg C.) and 823 K (550 deg C.) with longer brazing time, Al diffuses as brazing time elapses so that the Ag layer is reduced, thus residual Ag layer. As a result, direct Al—Cu reaction takes place, drastically reducing tensile strength.

Based on these results, attention was paid to the dependency on the remaining Ag layer of the strength of brazing joints and deformation behavior of the brazing joints, making clear the importance of using appropriate brazing temperature ranges to provide adequate liquid phase and good brazing as well as setting the brazing time so that the initial Ag layer is not diminished.

The "first Al—Cu bonded structure" of the present invention based on this focus is a brazed bonded structure characterized by the use of Ag as an insert material in the bonding interface between the Al component and the Cu component, with the Ag layer remaining on the bond interface after brazing. The requirement for an Ag layer to remain in the Al—Cu bond interface is based on the following reasons.

First, leaving an Ag layer in the brazed Al—Cu bond interface obstructs direct Al—Cu reaction and restricts the creation of δ and θ phases, which are harmful Al—Cu intermetallic compounds.

Second, leaving an Ag layer at the Al—Cu bonded interlayer promotes and maintains the lacy formation of the Ag—Al intermetallic compound $Ag_2Al$.

Intermetallic compounds are generally brittle, and, in terms of hardness, $Ag_2Al$ would be expected to have low strength, like δ and θ phases, which are Al—Cu intermetallic compounds. However, $Ag_2Al$ forms in a lacy dispersed manner in the surrounding Al so that even the local fracture does not immediately lead to overall fracture and instead leads to ductile deformation behavior by surrounding Al. Thus, the strength of brazing joints has a strength similar to that of the Al base material.

In the first Al—Cu bonded structure of the present invention, it would be preferable to have the thickness of the remaining layer be 10 μm or more in order to keep this role of the Ag layer. On the other hand, as long as direct reaction between Al and Cu can be prevented, the thickness of the Ag layer does not affect the region in which the Al—Ag intermetallic compound $Ag_2Al$ is formed. Thus, the thickness of the Ag layer does not directly affect the strength of brazing joints. As a result, there is no restriction in the present invention in terms of the upper limit of the thickness of the Ag layer.

In the method of making the present invention, the brazing temperature must be set to an appropriate range and the brazing time must be set so that the residual Ag layer is not diminished during the time which the brazing temperature is maintained.

For this appropriate brazing temperature, a temperature is selected that allows adequate formation of liquid phase at the bond section so that good brazing is provided. Furthermore, since there is reduction due to the diffusion of Al as brazing time elapses, the brazing time is selected that allows a predetermined Ag layer thickness to be left.

The tensile strength of brazing joints is dependent on the region in the brazed section where the lacy $Ag_2Al$ is formed. The tensile strength is roughly fixed regardless of the width of the residual Ag layer. However, if the brazing time is inappropriate and the residual Ag layer is removed, tensile strength is rapidly reduced due to direct Al—Cu reaction.

When an Al—Si-based brazing sheet is used in the method for making the present invention, the brazing temperature must exceed 813 K (540 deg C.). For example, when an Al-10Si-1.5 Mg-0.1 Bi-based alloy resin is used, the solidus temperature is 832K (559 deg C.) and the liquidus temperature is 864 K (591 deg C.), and the Ag diffuses into the brazing sheet during the initial stage of brazing, leading to a reduced melting point of the brazing sheet. Even taking this drop in the melting point of the brazing sheet into account, a brazing temperature of 813 K (540 deg C.) or less will lead to inadequate liquid phase, preventing the brazing from proceeding.

According to the method for making the present invention, it would be preferable to use a brazing temperature of 823 K +/–5 K (550 deg C. +/–5 deg C.). If the brazing temperature is less than the lower limit of this temperature range, an adequate liquid phase is not created and brazing does not proceed, as described above. If, on the other hand, the brazing temperature exceeds the upper limit of this temperature range, the melting of Al base material becomes pronounced so that the shape of the structure cannot be maintained.

In the method for making the present invention described above, for an insert material thickness of 100 microns, the brazing temperature is set to 823 K +/–5 K (550 deg C. +/–5 deg C.) and the brazing time is set to 1800 sec or less. There is partial melting of the initial Ag layer due to its reacting with the brazing sheet and there is reduction as brazing time elapses, so the brazing time is limited so that a predetermined Ag layer thickness remains.

This limit to the brazing time is affected by the thickness of the initial Ag layer that is inserted. Thus, when the inserted initial Ag layer is thick enough, there is no limit to the brazing time as long as an Ag layer can remain at the bonded interlayer.

To determine brazing conditions in practical implementations, brazing time must be set according to the size of the product so that the entire bond section can be heated to a uniform brazing temperature. The conditions must be set so that the residual Ag layer does not disappear, and the thickness of the initial Ag layer must be increased if necessary.

Embodiment 1-1

The advantages of the Al—Cu bonded structure and the method for making the same according to the present invention will be described using a specific implementation as an example.

(1) Test Material and Test Method

The Al base material used in this embodiment is commercially available, industrial-use pure Al (Al050). The solder is a commercially Al-10Si-1.5 Mg-0.1Bi-based solder foil (4104-equivalent, solidus temperature: 832 K (559 deg C.), liquidus temperature: 864 K (591 deg C.), thickness: 100 microns). The Ag used as the insert material is a pure silver foil (99.99% purity), which is clad to oxygen-free (C1020) and is commercially available as an Ag-clad Cu plate (Ag thickness: 100 microns, Cu thickness: 3 mm).

The brazing of the test pieces is performed with a high-temperature vacuum furnace using a resistance heater, with two types of test pieces being used: a crosslap joint test piece and an axial tension test piece. With the axial tension test piece, a 30 mm square Ag-clad Cu plate and a 28 mm diameter round Al bar are layered, interposed by brazing sheet, and brazed. This is then machined to predetermined dimensions, secured with bolts to a stainless steel dedicated tool, and put through a tensile test.

Brazing is performed under the following conditions: a spring applies an initial load of 0.1 Mpa; the vacuum in the furnace is maintained at 0.3–0.4 mPa; the brazing temperature is 813 K–830 K (540 deg C.–557 deg C.); and the brazing time is 60–3600 sec.

The tensile test for the brazing joints is a static tensile test using an autograph. The velocity of the crosshead is $8.3 \times 10^{-2}$ mm/sec.

(2) Test Results of the Brazing

FIG. 4 shows the relationship between tensile strength of the brazing joints and brazing time for different brazing temperatures (813–830 K (540–557 deg C.)). At a brazing temperature of 813 K (540 deg C.), brittle fractures accompanied by almost no base material deformation took place for all brazing time, with the fracture sites all being at the bond section. The tensile strength was very low, averaging at approximately 15 Mpa. The bond section did not form adequate liquid phase, preventing brazing.

At brazing temperatures of 818 K (545 deg C.) and 823 K (550 deg C.), for brazing time of 1800 sec or less, the tensile strength of the brazing joints increased to that of the Al base material, 65 Mpa, with fracture taking place at the Al base material. Also, there was significant base material deformation up to the point of fracture, demonstrating ductile deformation behavior.

However, even at brazing temperatures of 818 K (545 deg C.) and 823 K (550 deg C.), if the brazing temperature was set to 3600 sec, the tensile strength rapidly decreased. This is because the residual Ag layer disappeared as the brazing time elapsed, leading to direct reaction between the Al and Cu.

At a brazing temperature of 830 K (557 deg C.), data is only available for a brazing time of 60 sec. This is because longer brazing time led to excessive melting of the Al base material, preventing the shape of the test piece from being maintained. In this case, brittle deformation behavior not accompanied by deformation of the base material was seen, and the fracture site was at the bond section.

Figure 5:
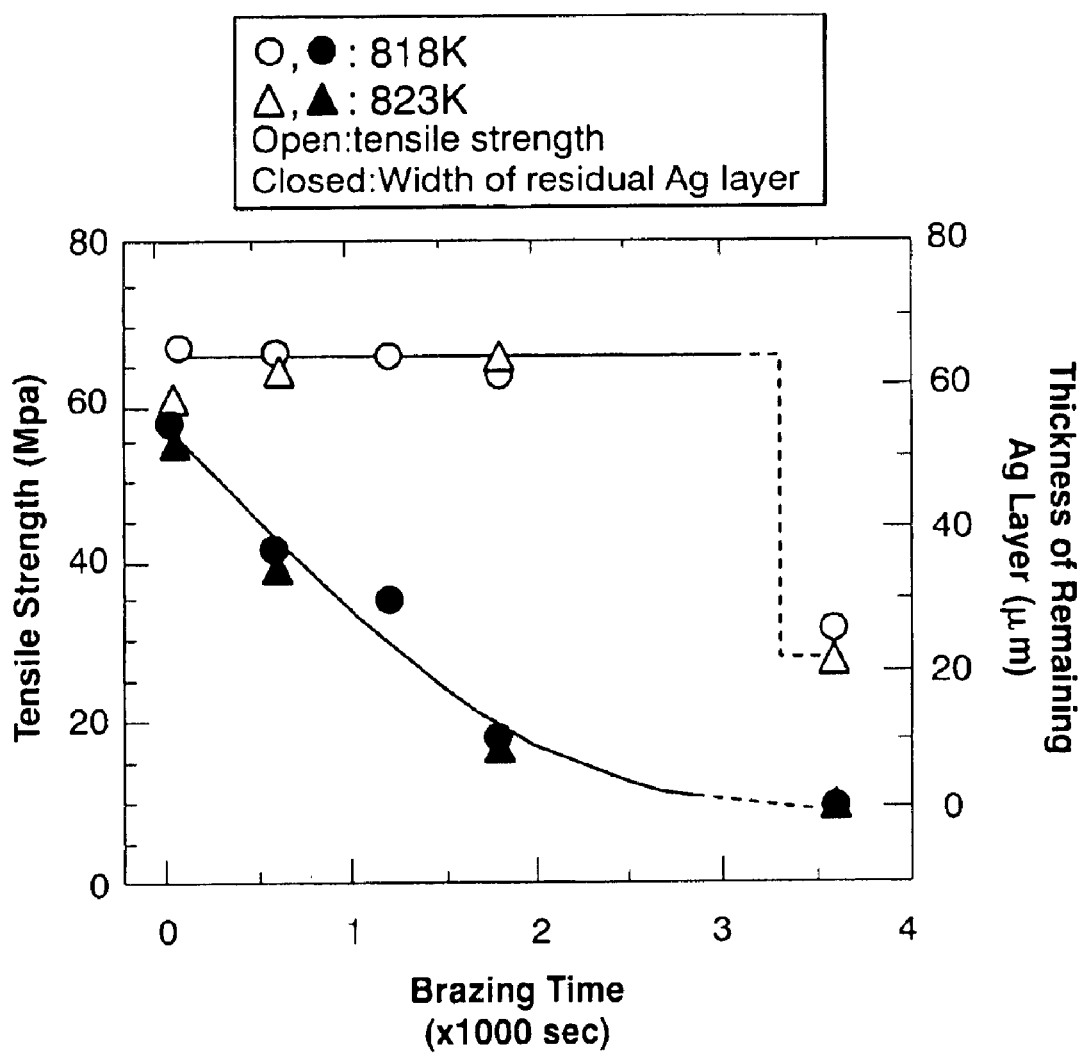
FIG. 5 is a drawing showing the relationship between brazing time and the width of residual Ag layer as well as the brazing time and the tensile strength of the brazing joints, when the brazing temperature is 818 K (545 deg C.) and 823 K (550 deg C.).

FIG. 5 shows the relationship between the brazing time and the tensile strength of brazing joints and the relationship between the brazing time and the width of residual Ag layer for brazing temperatures of 818 K (545 deg C.) and 823 K (550 deg C.). In the figure, the relationship between brazing time and tensile strength of brazing joints is indicated by open circles and open triangles, while the relationship between brazing time and residual Ag layer thickness is indicated by solid circles and solid triangles.

As described above, there is partial melting of the initial Ag layer due to its reaction with the brazing sheet. This is followed by diminishing due to Al diffusion as brazing time elapses. This is why when the brazing time exceeds 3000 sec, the remaining Ag layer disappears, causing the Al and Cu to directly react and suddenly lowering the strength of brazing joints.

Figure 6:
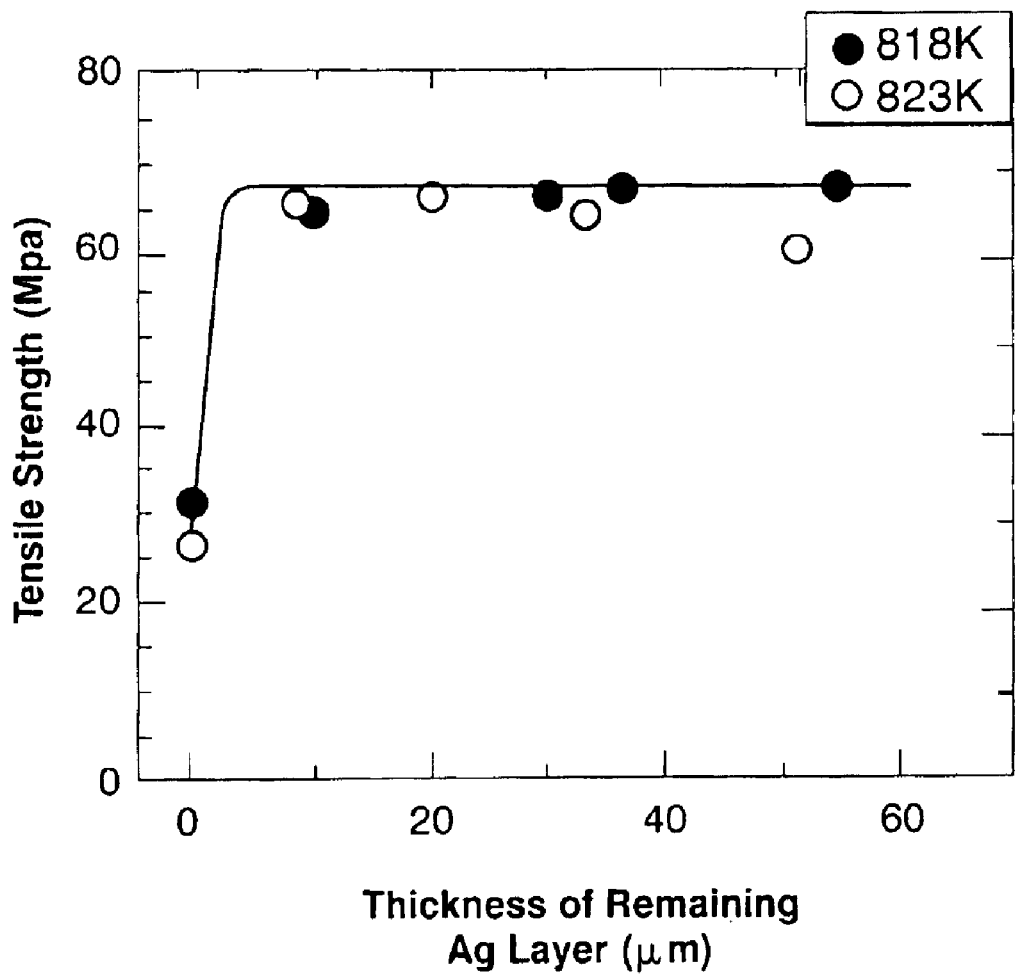
FIG. 6 is a drawing showing the relationship between the width of residual Ag layer and the tensile section of the brazing joints when the brazing temperature is 818 K (545 deg C.) and 823 K (550 deg C.).

FIG. 6 shows the relationship between the width of residual Ag layer and the tensile strength of brazing joints when the brazing temperature is 818 K (545 deg C.) and 823 K (550 deg C.). Within the bended interlayer containing the lacy layer ($Ag_2Al$), the tensile strength of brazing joints stays fixed regardless of the thickness of the residual Ag layer, but if the residual Ag layer thickness becomes less than 10 microns and disappears, there is direct reaction between the Al and the Cu, resulting in a significant drop in the tensile strength.

With the method for making the Al—Cu bonded structure of the present invention as described above, an Ag layer can be effectively kept in the Al—Cu bond interface so that a tensile strength similar to that of the base material A can be obtained and superior bonding properties can be provided.

1-2. Advantages of Invention

In the method for making the first Al—Cu bonded structure of the present invention, an appropriate brazing temperature is maintained for an appropriate duration, allowing an Ag layer to remain in the Al—Cu bond interface effectively. The resulting Al—Cu bonded structure then exhibits ductile deformation behavior, the tensile strength of brazing joints is similar to that of Al base material, and superior bond characteristics can be provided.

2. "Thin Al—Cu Bonded Structure" and Method for Making the Same

Out of the objects of the invention described above, the thin Al—Cu bonded structure of the present invention accommodates the dimensional characteristics demanded in heat exchangers and heat transfer devices, providing superior dimensional precision and flexibility to handle diverse dimensions.

Figure 2:
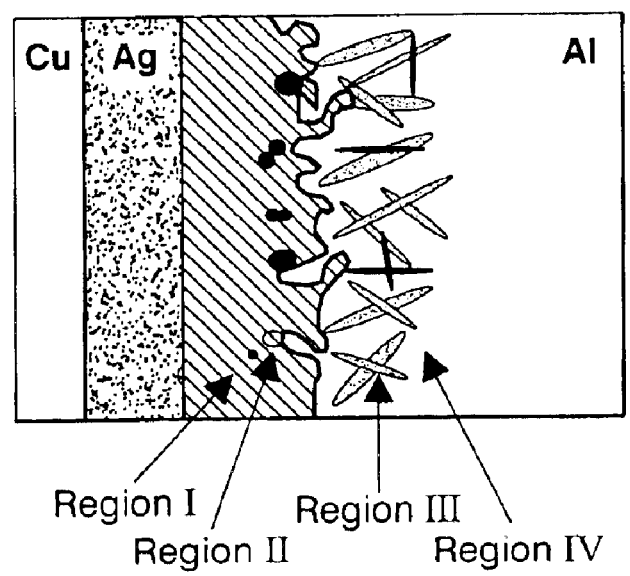
FIG. 2 is a schematic illustration showing a representative structure of a bonded interlayer where Ag is used as an insert material in an Al—Cu bonding interface and an Al—Si—Mg—Bi-based brazing sheet is used.
Figure 3:
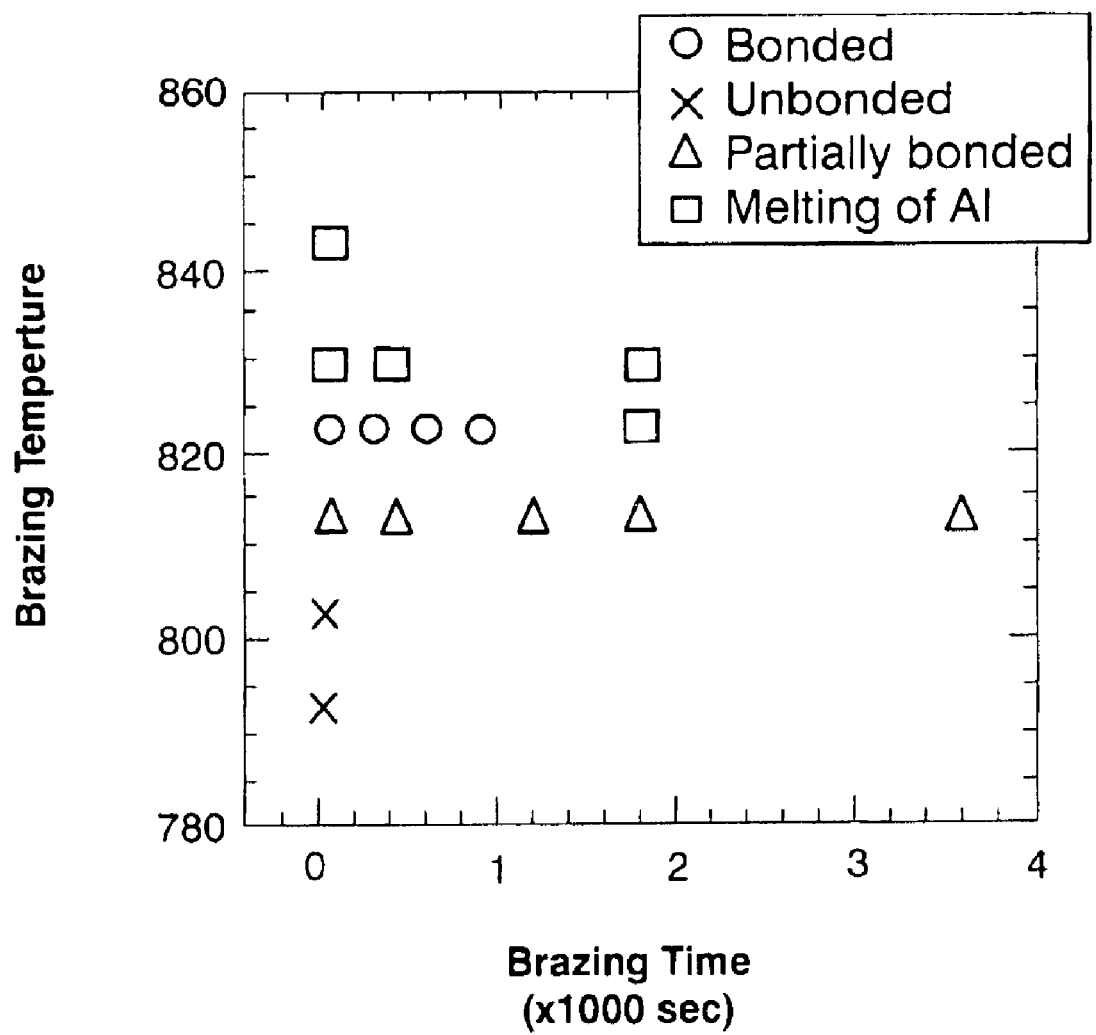
FIG. 3 is a drawing showing the results of a visual inspection of test pieces in which brazing was performed with an Ag insert where the brazing temperature was 793–843 K (520–570 deg C.) and the brazing time was 60–3600 sec.

As shown in FIG. 2, when Al—Si-based brazing sheet is used for brazing, inserting Ag as an insert material in the Al—Cu bond interface to form a bonded interlayer results in the initial Ag at the brazed section remaining and providing advantages for workability of the Al—Cu bond component.

When a shear fracture test of the brazed bond section is performed, the observed deformation behavior is ductile fracture in the Al region. The tensile strength of the bond section is similar to that of the Al base material, with the strength being dramatically improved compared to direct Al—Cu brazing.

When brazing is performed using Ag as an insert material in the Al—Cu bond interface, the strength and deformation behavior of the brazed bond are similar to those of the Al base material. Furthermore, ductile fracture takes place primarily in the Al base material region.

In order to provide the dimensional characteristics suited for compact, thin, light-weight, and high-performance electronic devices, the use of cold or hot rolling to reduce wall-thickness is effective.

More specifically, applying cold or hot rolling makes it possible to obtain predetermined dimensional accuracy. Furthermore, predetermined machine dimensions can be achieved by using processing settings appropriate to the final target dimensions needed. As a result, dimensions can be set according to what is needed.

The deformation behavior of the Al—Cu bonded component shown in FIG. 2 is similar to that of the Al base material, and ductile facture takes place primarily in the Al base material region. Thus, conventional Al rolling can be applied to this Al—Cu bonded component, making it possible to produce an Al—Cu bonded structure having superior dimensional characteristics.

In the rolling of the Al—Cu bonded component, it becomes important to limit reduction of deformability due to work hardening and the like and to limit growth of intermetallic compounds at the bonded interlayer. When reducing wall-thickness through cold rolling, the growth of intermetallic compounds can be prevented but the deformability of the component is reduced due to work hardening, making it difficult to achieve adequate wall-thickness reduction. As a result, it is necessary to recover from the reduced deformability due to work hardening and the like by applying heat treatment for each cold rolling.

In contrast, if hot rolling can be implemented within a temperature range that prevents growth of intermetallic compounds while not reducing the deformability, there is no need to apply heat treatment after each processing operation. Because of this, when rolling the Al—Cu bond component, it would be preferable to perform wall-thickness reduction by performing hot rolling.

The "thin Al—Cu bonded structure" of the present invention was developed based on the above observations and relates to an Al—Cu bonded structure made by forming an Al—Cu bonded component and reducing its wall-thickness by rolling the component. The details of the invention will be described below in terms of the workability of the Al—Cu bonded component and the rolling of the component.

(1) Workability of the Al—Cu Bonded Component

The workability of the Al—Cu bonded component is derived from the Ag layer that remains at the brazed section when bonding is performed by using Ag as an insert material in the Al—Cu bonding interface.

More specifically, by leaving an Ag layer at the brazed Al—Cu bond, direct Al—Cu reaction is obstructed, preventing the formation of delta phase and theta phase, which are harmful Al—Cu intermetallic compounds.

Also, leaving an Ag layer at the start of the brazing reaction promotes and maintains the formation of a lacy $Ag_2Al$, which is an Ag—Al intermetallic compounds. This $Ag_2Al$ is dispersed as a lacy pattern in the surrounding Al so that destruction of one section does not immediately lead to the destruction of the entire structure. This provides ductile deformation based on the ductile deformation behavior of the surrounding Al.

Furthermore, $Ag_2Al$, which is an Ag—Al intermetallic compound, also affects the stress distribution at the bonding section. According to the analysis of the present inventors, at the direct Al—Cu bonding section, the maximum primary stress concentration is generated within θ phase in response to tensile load.

In the bonding section involving the Ag insert shown in FIG. 2, the maximum primary stress concentration is generated at the intersections of the $Ag_2Al$ mesh. As a result, there is particularly no prominent stress concentration in the surrounding Al, leading to a roughly uniform stress distribution.

Figure 1:
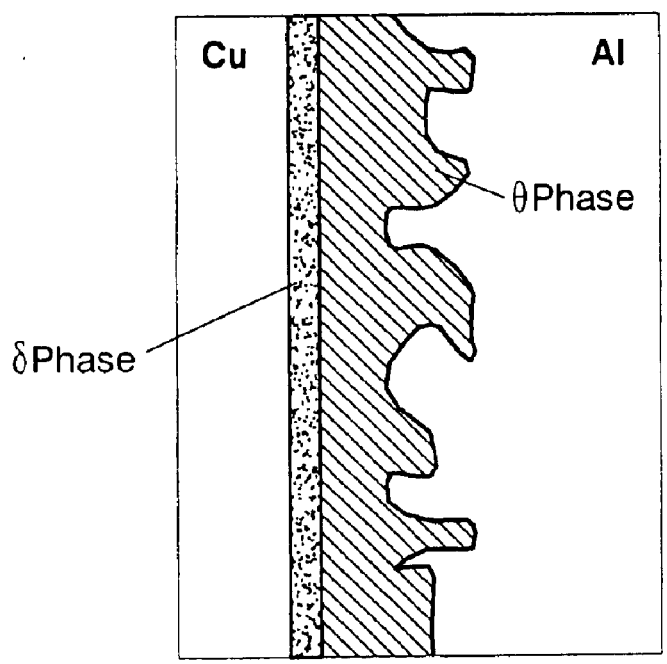
FIG. 1 is a schematic illustration showing a representative structure of a bonded interlayer where Al and Cu are directly brazed with an Al—Si-based brazing sheet.

Because of this, a comparison of the deformation behavior in these two structures shows that in the Al—Cu direct bond shown in FIG. 1, the application of tensile load causes fracture at the maximum primary stress concentration generated in θ phase. This fracture propagates instantaneously.

In contrast, with the bond shown in FIG. 2, i.e., the bond where Ag is used as an insert material in the Al—Cu bonding interface, application of a similar tensile load leads to stress concentration in the $Ag_2Al$ formed lacy in Region III. Even if localized fracture takes place, however, this does not lead to instantaneous destruction. The tensile load is instead borne by surrounding Al, leading to ductile deformation.

FIG. 4 shows the relationship between tensile strength of the Al—Cu bonded component and brazing time using the brazing temperature as a parameter. The brazing temperature is varied over the range 813 K–830 K (540 deg C.–557 deg C.).

As described above, an adequate liquid phase is not generated at the bonding section with a brazing temperature of 813 K (540 deg C.), preventing brazing. Thus, the structure exhibited brittle fracture with almost no base material deformation regardless of the brazing duration. Furthermore, the fracture all took place at the brazed section, with the tensile strength being very low at an average of approximately 15 Mpa.

With a brazing temperature of 830 K (557 deg C.), there was significant melting of the Al base material, resulting in brittle deformation of the bonded section not accompanied by deformation in the base material. The fracture took place at the bonded section.

In contrast, with the brazing temperature at 818 K (545 deg C.) and 823 K (550 deg C.), brazing time of 1800 sec or less resulted in an increase in the tensile strength of brazing joints to 65 Mpa, which is the tensile strength of the Al base material. Fracture took place at the Al base material. Also, there was significant base material deformation leading up to the fracture, with fracture taking place after there was ductile deformation.

Thus, with brazed bonded components in which Ag is used as an insert material in the bonding interface of the Al component and the Cu component, an effective Ag layer can be left in the Al—Cu bonding interface by setting an appropriate brazing temperature range along with an appropriate time over which the temperature is maintained. This makes it possible to provide ductile deformation with the strength of the bonding section being similar to that of the Al base material. Since superior workability is given, the structure can undergo rolling.

(2) Rolling of the Al—Cu Bonded Component

In the method for making the present invention, cold or hot rolling is performed to reduce wall-thickness of the Al—Cu bonded component. If hot rolling is performed at a temperature range that allows the reduced mechanical characteristics of Al to be restored, the application of heat treatment at each rolling step to restore reduced strength becomes unnecessary.

For this reason, it would be preferable to use hot rolling for the rolling process in the present invention, but it is necessary to set the processing temperature to be not higher than a temperature that prevents growth of intermetallic compounds at the bonding section.

In the method for making the present invention, it would be preferable to perform processing at 623 K (350 deg C.)–773 K (500 deg C.) so that hot rolling can be performed repeatedly in a stable manner. If the processing temperature is less than 623 K (350 deg C.), the reduced deformability prevents adequate recovery, requiring heat treatment to be performed anew.

It would be preferable to set the upper limit of the processing temperature to 773 K (500 deg C.). If rolling is performed at a temperature beyond 773 K (500 deg C.), the resulting increase in growth of the first phase shown in FIG. 2 can lead to sudden reduction in the thickness of the Ag layer, with repeated rolling resulting in the Ag layer disappearing altogether. This makes it possible for harmful Al—Cu intermetallic compounds to be formed from the direction reaction between Al and Cu.

In the method for making the present invention, the thickness of the rolled Al—Cu bonded structure can be set as low as 0.1 mm in order to provide suitable dimensions. In such cases, the processing schedule for the rolling operations is set up according to the final target dimension. If hot rolling is to be performed repeatedly, it would be preferable to set the reduction to 20%+/−10%, where the reduction rate (Rd) is the pre-processing thickness-post-processing thickness)/(pre-processing thickness before rolling)×100%.

Furthermore, in the method for making the present invention, it would be preferable to perform annealing after the finishing rolling operation. This is to restore the mechanical characteristics of the Al that were reduced by the rolling operations as well as to restore the mechanical characteristics of the thin Al—Cu bonded structure and to provide stable strength. For the annealing performed after the finish of rolling operation, 400 deg C.×30 minutes is the reference.

In the thin Al—Cu bonded structure of the present invention, rolling is performed on the Al—Cu bonded component as described above. This provides superior dimensional precision and allows flexible handling of diverse dimensions. Furthermore, the light weight of Al can be combined with the thermal transmission, thermal diffusion, and corrosion resistance characteristics of Cu. As a result, the structure is suitable as material for heat exchangers and heat release material.

2-1 Embodiment

The advantages of the thin Al—Cu bonded structure and methods for making the same according to the present invention will be described using a specific embodiment.

(1) Produce Al—Cu Bond Component

For this embodiment, a commercially available industrial pure aluminum (Al050) was used for the Al base material. The Ag used as the insert material is a pure silver foil (99.99% purity), which is clad to oxygen-free (C1020) and is commercially available as an Ag-clad Cu plate (Ag thickness: 100 microns, Cu thickness: 3 mm).

First, in order to form an insert layer on the surface of the Cu base material, a mirror finish is applied to the surface of the Cu base material, an Ag foil with a thickness of 100 microns is mounted so that it is in contact with the surface of the Cu base material, and solid-phase diffusion is performed. The diffusion conditions are: diffusion temperature 1038 K (765 deg C.), diffusion time 5 hr, and contact load 2.54 Mpa. The diffusion bond is performed in a vacuum of 5×10^−3 Torr and hydraulic pressure is used to apply pressure.

The brazing sheet is a commercial available Al-10Si-1.5 Mg-0.1Bi-based alloy foil (4104-compatible, solidus temperature: 832 K (559 deg C.), liquidus temperature: 864 K (591 deg C.), thickness: 100 microns), and is used to braze the insert layer and the Al base material (Al thickness: 3 mm).

In performing the bond, the bond interface is thoroughly degreased with acetone, a spring is used to apply 94 Mpa, and furnace brazing is performed at a temperature of 550 deg C. (823 K) for 10 minutes. The Al—Cu bonded component after brazing has a thickness of 6 mm, with Cu thickness being roughly 3 mm and the Al thickness being roughly 3 mm.

(2) Rolling and the Structure of the Bonded Section

Using the resulting Al—Cu bonded component as the starting material, hot rolling is performed multiple times to produce a thin Al—Cu bonded structure having a final thickness of 0.8 mm. The temperature for hot rolling is set to 400 deg C., with a reduction of 20% for each rolling operation.

The specific rolling schedule is as follows: 6 mm total thickness→4.8 mm (Rd: 20%)→3.84 mm (Rd: 20%)→3.07 mm (Rd: 20%)→2.46 mm (Rd: 20%)→1.97 mm (Rd: 20%) →1.58 mm (Rd: 20%)→1.26 mm (Rd: 20%)→1.0 mm (Rd: 21%)→0.8 mm (Rd: 20%). After a total reduction rate for the hot rolling of 87% and a final thickness of 0.8 mm, annealing is performed at 400 deg C.×30 minutes.

Figure 7:
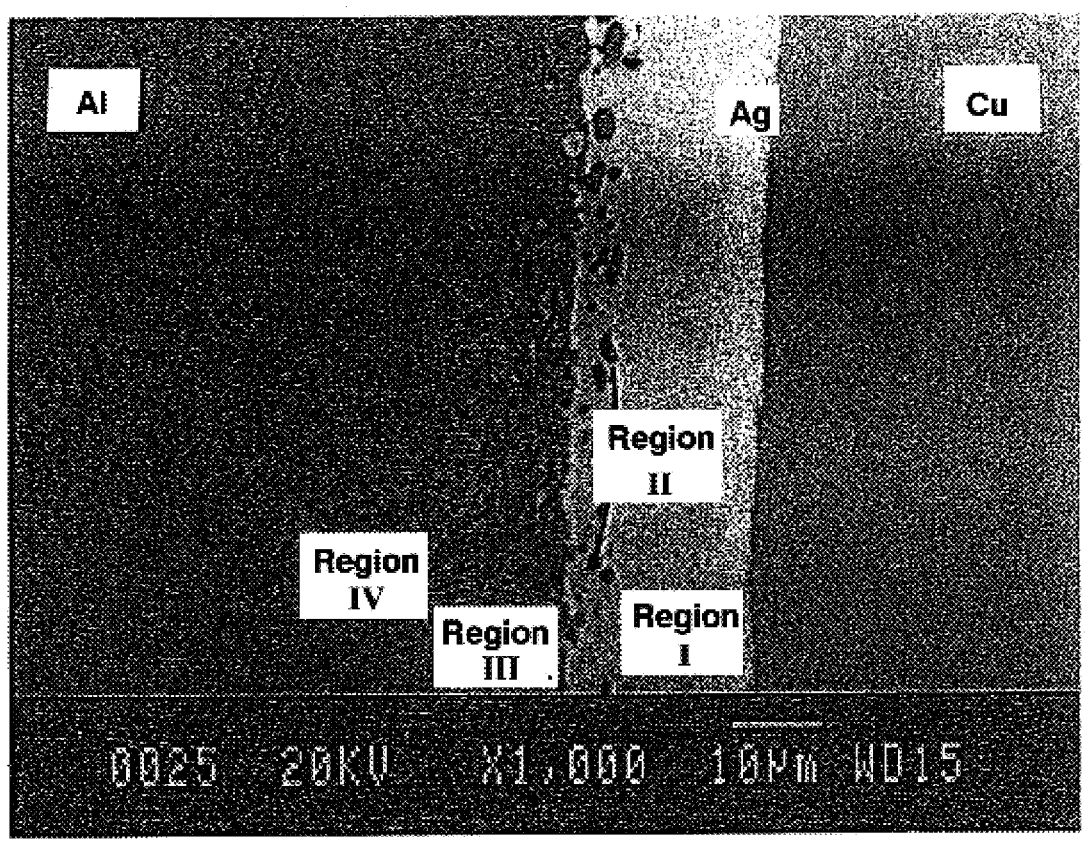
FIG. 7 is a SEM image of bonded interlayer after the structure has been finished through hot rolling to a thickness of 0.8 mm.

FIG. 7 shows the results of an SEM observation of the structure of the bonded interlayer after the component has been hot-rolled to a thickness of 0.8 mm. As the figure shows, the bonded interlayer contains, starting from the right in the figure, a Cu base material, an Ag layer, an Ag—Al reaction region, and an Al base material. The Ag layer had a thickness of 100 microns before processing, but the layer left after bonding has a thickness of 5–8 microns. Also, the wall-thickness of the Cu base material and the Al base material was uniformly reduced according to the reduction rate.

The reaction region has a complex structure, but as the schematic illustration in FIG. 2 shows, the initial component contains Region I through Region III in the Al—Cu bonded component. After the component has been finished to a thickness of 0.8 mm, the reaction regions of the Al base material, the Ag layer, and the bonded interlayer did not show any defects of the like.

Furthermore, when hot rolling as described above was performed multiple times to reduce wall-thickness to a final thickness of 0.1 mm, it was found that the thin Al—Cu bonded structure of the present invention could be formed with no defects or the like in the Cu base material, the Al base material, the Ag layer, and the Ag—Al reaction region.

2-2 Advantages of the Invention

With the method for making the thin Al—Cu bonded structure of the present invention, a component with an Al—Cu dissimilar joint having superior workability can be formed. By performing rolling to reduce wall-thickness, a thin Al—Cu bonded structure having superior dimensional accuracy and the ability to accommodate a diversity of dimensions can be made. This thin Al—Cu bonded structure combines the light weight of Al and the heat transfer, heat diffusion, and corrosion resistance of Cu. The structure can meet the needs of compact, thin, light-weight electronic devices.

With the Al—Cu bonded structure of the present invention, an Ag layer can be left in the Al—Cu bonded interlayer. This provides ductile deformation behavior, with the tensile strength of the bonded interlayer being similar to that of the Al base material, resulting in superior bonding characteristics. Thus, the structure can be used as an Al—Cu dissimilar material bonded structure in a wide variety of applications.

Furthermore, the component containing an Al—Cu dissimilar joint has superior workability so that a thin Al—Cu bonded structure is provided with superior dimensional precision and flexibility to diverse dimensional demands.

The resulting thin Al—Cu bonded structure combines the light weight of Al with the heat transfer, heat dissipation, and corrosion resistance properties of Cu. This allows it to meet the demands of compactness, thinness, light weight, and high performance for electronics devices and allows it to be used in a wide variety of applications as material for heat exchangers and heat transfer devices.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A brazed bonded structure comprising:

an Al component;

a Cu component; and

Ag as an insert material between the Al component and the Cu component, wherein an Ag layer partly remains in the interlayer between the Al component and the Cu component and partly forms a mesh of $Ag_2Al$ intermetallic compound after brazing and bonding the Al—Cu component.

2. An Al—Cu bonded structure according to claim 1 wherein said remaining Ag layer has a thickness of 10 $\mu$m or more.

3. A method of making an Al—Cu bonded structure comprising:

brazing an Al component and an Cu component with Ag used as an insert material between the Al component and Cu component, wherein a layer of said Ag is made to partly remain between the Al—Cu components and to partly form a mesh of $Ag_2Al$ intermetallic compound.

4. A method of making an Al—Cu bonded structure comprising:

brazing an Al component and an Cu component with Ag used as an insert material between the Al component and Cu component, wherein said brazing is performed at a temperature of more than 813 K (540 deg C.), and a layer of said Ag is made to partly remain between the Al—Cu components and to partly form a mesh of $Ag_2Al$ intermetallic compound.

5. A method of making an Al—Cu bonded structure according to claim 4 wherein, when said insert material has a thickness of 100 microns, said brazing is performed at a temperature of 823 K +/−5K (550 deg C.+/−5 deg C.) with a brazing time of no more than 1800 sec, and a layer of said Ag is made to remain between the Al—Cu components.

6. A method of making an Al—Cu bonded structure according to claim 3 or claim 4 wherein said remaining Ag layer has a thickness of 10 $\mu$m or more.

7. A thin Al—Cu bonded structure comprising:

an Al component;

a Cu component; and

Ag as an insert material in the interlayer between the Al component and the Cu component, which includes a mesh of $Ag_2Al$ intermetallic component, wherein the resultant Al—Cu brazed bonded component is rolled to produce the Al—Cu bonded structure.

8. A thin Al—Cu bonded structure as described in claim 7 wherein hot rolling is performed on said Al—Cu brazed bonded component.

9. A thin Al—Cu bonded structure as described in claim 7 or claim 8 wherein said structure has a thickness of 0.1 mm or more.

10. A method of making a thin Al—Cu bonded structure comprising:

providing a brazed bonded component comprising an Al component, a Cu component, and Ag as an insert material in the interlayer between the Al component and the Cu component; and rolling the brazed bonded component.

11. A method for making a thin Al—Cu bonded structure according to claim 10 wherein said rolling is performed as hot rolling.

12. A method for making a thin Al—Cu bonded structure according to claim 11 wherein said hot rolling is performed at 623 K–773 K (350 deg C.–550 deg C.).

13. A method of making a thin Al—Cu bonded structure according to claim 11 or claim 12 wherein said hot rolling is repeated such that a reduction at each rolling is 20% +/−10%.

14. A method of making a thin Al—Cu bonded structure according to any one of claims 10–12, further comprising:

annealing the brazed bonded component after finishing said hot rolling.

* * * * *